United States Patent [19]

Blankenship

[11] 4,310,339
[45] Jan. 12, 1982

[54] METHOD AND APPARATUS FOR FORMING AN OPTICAL WAVEGUIDE PREFORM HAVING A CONTINUOUSLY REMOVABLE STARTING MEMBER

[75] Inventor: Michael G. Blankenship, Corning, N.Y.

[73] Assignee: Corning Glass Works, Corning, N.Y.

[21] Appl. No.: 155,422

[22] Filed: Jun. 2, 1980

[51] Int. Cl.³ .................. C03B 37/025; C03B 37/075
[52] U.S. Cl. .................................... 65/3.12; 65/144; 65/18.2; 118/729; 118/730; 264/1.5; 264/2.7; 425/224; 427/163
[58] Field of Search ............... 65/3 A, 13, 108, 109, 65/144, 3.12, 18.2; 427/163, 189, 190, 191, 192, 193, 199, 201, 203, 204, 205, 255, 255.3, 255.5, 255.7; 118/729, 730; 264/1, 60, 81, 166, 1.2, 1.5, 1.6, 2.7, 241; 425/79, 130, 224

[56] References Cited

U.S. PATENT DOCUMENTS

| | | | |
|---|---|---|---|
| Re. 28,029 | 6/1974 | Keck et al. | 65/3 A X |
| 3,652,248 | 3/1972 | Loxley et al. | 65/13 X |
| 3,933,454 | 1/1976 | DeLuca | 65/3 A |
| 4,062,665 | 12/1977 | Izawa et al. | 65/3 A |
| 4,102,663 | 7/1978 | Jung | 65/144 X |
| 4,198,223 | 4/1980 | Goell et al. | 65/3 A |
| 4,224,046 | 9/1980 | Izawa et al. | 65/3 A |
| 4,230,472 | 10/1980 | Schultz | 65/3 A |

FOREIGN PATENT DOCUMENTS

54-131044 10/1979 Japan.

*Primary Examiner*—Richard V. Fisher
*Attorney, Agent, or Firm*—Walter S. Zebrowski

[57] ABSTRACT

A substantially continuous method of and apparatus for forming an article suitable for an optical waveguide preform wherein the starting member is continuously removed is disclosed. The preform is formed by providing a starting member or bait and applying the particulate material to the exterior surface of the starting member to form a coating thereon. The coating is longitudinally translated while simultaneously additional particulate material is applied to the coating to form a preform body with the preform body thereafter being longitudinally translated. While longitudinally translating the preform body and applying additional particulate material to the end thereof, the starting member is continuously removed from the preform body leaving a longitudinal aperture remaining in the preform body. The particulate material may be applied by one or more burners, the output of which may be controlled to provide a predetermined desired cross sectional composition variation of the resulting preform body. The so formed preformed body may thereafter be suitably heated, consolidated, and drawn into an optical waveguide.

43 Claims, 8 Drawing Figures

METHOD AND APPARATUS FOR FORMING AN OPTICAL WAVEGUIDE PREFORM HAVING A CONTINUOUSLY REMOVABLE STARTING MEMBER

BACKGROUND OF THE INVENTION

This invention relates to a substantially continuous method of making an article suitable for an optical waveguide preform, and more particularly to a method of forming an optical waveguide preform while continuously removing the starting member from the preform body while it is being formed.

High capacity communication systems operating around $10^{15}$ Hz are needed accomodate future increases in communication traffic. The systems are referred to as optical communication systems since $10^{15}$ Hz is within the frequency spectrum of light. Optical waveguides, which are the most promising medium for transmission at such frequencies, normally consist of an optical filament having a transparent core surrounded by transparent cladding having a refractive index which is lower than that of the core. A very thorough and complete discussion concerning operational theories of optical waveguides is contained in U.S. Pat. No. 3,157,726 issued to Hicks et al., and in the publication "Cylindrical Dielectric Waveguide Modes" by E. Snitzer, Journal of the Optical Society of America, Vol. 51, No. 5, pp. 491-498, May 1961. Other excellent sources of information concerning optical waveguides is "Fiber Optics—Principles and Applications" by N. S. Kapany, Academic Press, 1967, as well as "Fundamentals of Optical Fiber Communications" edited by Michael K. Barnoski, Academic Press, 1967.

Generally optical waveguides are made by either outside or inside vapor phase oxidation as hereinafter more particularly defined. In the inside vapor phase oxidation process a starting member or mandrel in the form of a tube is used and a coating of predetermined desired glass is deposited on the inside thereof. The structure so formed is thereafter heated, the inner hole collapsed, and drawn into an elongated filament which comprises the optical waveguide. The inner deposited coating of such a process comprises the core of the waveguide while the tubular starting member comprises the cladding. In the outside vapor phase oxidation process, a starting rod or tube is used as a starting member, bait, or mandrel, on the outside surface of which is deposited one or more layers of suitable material. Ordinarily, the starting member or mandrel is removed leaving the deposited structure as the preform for the subsequent waveguide. Where a tube is employed as a starting member and is either left in place or removed a center hole exists in the same manner as if a solid rod was removed from the deposited material. The center hole must thereafter be closed before or during drawing and a solid elongated waveguide filament drawn. In the outside process, either the starting rod forms the core of the ultimate waveguide or the first deposited layers form the core of the ultimate waveguide, while the latter deposited layers form the cladding thereof.

When a starting member or mandrel is used and is intended to remain with the structure to ultimately form the core of the waveguide, substantial exterior surface preparation such as cleaning, smoothing, or the like is necessary before deposition thereto may take place. In addition, if the starting member or mandrel is intended to remain and become the core of the waveguide, it must be of very high purity glass, and have optical properties equivalent to the quality of the waveguide core, for example, low signal attenuation and equivalent index of refraction. Whenever a starting member or mandrel is used, whether it remains part of the optical waveguide preform or is removed, much processing is required such as mandrel cleaning, removal, etching and the like.

DESCRIPTION OF THE PRIOR ART

No prior art directed to the formation of an optical waveguide preform wherein the starting member, bait or mandrel is continuously removed during the formation of the preform is known to exist. However, some of the following art includes reference to the formation of an optical waveguide preform in connection with the fabrication of optical waveguides. U.S. Pat. No. 3,884,550 to Maurer et al. teaches the formation of a large solid blank or boule from which rods, which are intended to form the starting member, are core drilled and thereafter ground and polished. Such rods are of high purity and high optical quality glass if they are intended to be left as the core material of the ultimate optical waveguide. This reference also teaches a starting member formed by normal glass melting but cautions that such member may have an excessive impurity level and must ultimately be removed.

The stringent optical requirements placed on the transmission medium that could be employed in optical communications systems has negated the use of conventional glass fiber optics, since attenuation therein due to both scattering and impurity absorption is much too high. Since pure fused silica has the lowest known optical attenuation of any glass in the red and near infrared portion of the spectrum where optical communications appear most promising, pure fused silica and doped fused silica were among the earliest considered materials for use in the fabrication of optical waveguides. For example, single mode optical waveguides have been formed by inserting a titania doped silica fiber into a silica capillary. The tubing was heated and collapsed onto the central fiber, and the resulting cane was redrawn to waveguide dimensions. Waveguides produced in this manner are sometimes unsatisfactory since numerous tiny air bubbles and particles tend to form on the core-cladding interface resulting in light scattering sites and core diameter variations leading to very high attenuation.

U.S. Pat. No. 3,737,292 issued to D. B. Keck et al, teaches forming a starting member by grinding out or core drilling the member from a solid blank or boule. The outside surface of this cylindrical starting member is carefully polished and cleansed to remove surface irregularities and contaminations which might later cause light scattering. Surface polishing may be achieved by mechanical polishing, fire polishing, laser milling, or the like. This reference teaches a particularly suitable method of smoothing the outside surfaces of the cylinder by first mechanically polishing and thereafter flame polishing the mechanically polished surfaces. Hydrofluoric acid washing of all surfaces is performed before and after all polishing operations to avoid contamination. This reference teaches that, since the starting member is ultimately removed, it need be formed only of material having a composition and coefficient of expansion compatible with the waveguide cladding and core material thereafter deposited. This reference further teaches that the material does not need high purity and it may be formed of normally produced glass having ordinary or even excessive levels of purities or entrapped bubbles that would otherwise render it unsuitable for effective light propagation. Alternately, the reference teaches that the starting member may be formed of graphite or the like.

U.S. Pat. No. 3,775,075 issued to D. B. Keck et al. teaches the starting member formed in a manner very similar to that described in U.S. Pat. No. 3,737,292 hereinabove noted. A difference from the hereinabove described patent is that in this reference starting member is not removed and forms the core of the ultimate waveguide wherein purity of the material and surface treatment of the core member is particularly significant.

Removable mandrels or starting members are taught in U.S. Pat. No. 3,806,570 issued to Flamenbaum et al. In this reference, the starting member or mandrel is taught to be a non-metallic dense material having a thermal expansion characteristic less than $\alpha_{0-1000} \simeq 30 \times 10^{-7}/°C$. and a melting point above approximately 1400° C. Such a material is illustrated as graphite, fused quartz, glass-ceramic, or any crystalline refractory ceramic having low expansion characteristics such as $Al_2O_3$, mullite, BN, SiC, and the like.

A known method of producing a conventional optical fiber is disclosed in U.S. Pat. No. 3,227,032 to L. O. Upton. This method comprises inserting a rod of glass possessing the desired core characteristics into a tube of glass possessing the desired cladding characteristics. The temperature of this combination is then raised until the viscosity of the material is low enough for drawing. The combination is then drawn until the tube collapses around and fuses to the inside rod. This resulting combination rod is then further drawn until its cross-sectional area is decreased to the desired dimensions. This method is normally used to produce optical fibers having large core and thin outside cladding. As an example, the total diameter to core diameter ratio of such a fiber might be 8:7.

Continuous optical fiber preform fabrications is described in U.S. Pat. No. 4,062,665 issued to P. Izawa et al. In accordance with the method of that patent, a refractory starting member is rotated and at the same time moved along the axis of rotation. A glass raw material for the formation of the core of a porous preform, and consequently an optical filament preform, is introduced into a high temperature portion near the tip of a high temperature burner from a nozzle for the core disposed in alignment with the center of rotation of one end surface of the starting member. The glass raw material blown out from the nozzle for the core is caused by the flames of the high temperature burner to react to produce fine glass particles, which are deposited on the surface of the starting member at the central portion thereof in its axial direction to form a porous core. At least one nozzle for spraying a glass raw material for the formation of the cladding of the optical filament preform is disposed opposite to the end face of the starting member but a little deviated from the axis of rotation thereof, or disposed opposite to the peripheral surface of the porous core. The glass raw material from the cladding is sprayed from the nozzle for the cladding to the high temperature portion of the high temperature burner, and caused to react to form fine glass particles, which are deposited on the surface of the starting member on the outside of the porous core or on the peripheral surface thereof at the same time as the formation of the latter, forming a porous cladding. The porous preform thus obtained is moved into a high temperature furnace provided on the path of movement of the preform for devitrification thereof into an optical filament preform. In this connection, reference is also made to the publication "Continuous Fabrication of High Silica Fiber Preform" by T. Izawa, S. Kobayashi, S. Sudo, and F. Hanawa, 1977 International Conference on Integrated Optics and Optical Fiber Communication, July 18-20, 1977, Tokyo, Japan, Technical Digest, pp. 375-377. The Izawa et al. patent and publication teach a continuous fabrication method for making multimode step index or graded index preform by vapor phase axial deposition. This is a process in which the center bait rod is eliminated and both the core and the cladding glass are deposited continuously onto the end of the starting rod.

Continuous optical fiber fabrication is also taught by British Patent Application No. 2,009,140 by G. Cocito wherein a vitreous rod is heated to its softening point and drawn into a fiber at one end while powdered vitreous or vitrifiable material is continuously deposited onto an end of the rod remote from the drawn end. The deposited material is subjected to ion implantation as it is being deposited so as to produce a desired radial and axial refractive index distribution in the resulting fiber.

A method for forming and drawing fused metal-oxide tubes is taught in U.S. Pat. No. 3,620,704 issued to F. L. Gray. In accordance with the method of that patent, a fused silica tubing is formed by depositing a plastic vitreous mass of a metal oxide on a deposition zone of a selectively shaped, vertically suspended mandrel by vapor phase hydrolysis, heating the thus deposited metal oxide to a temperature sufficiently high to form a viscous glass melt or boule, rotating the mandrel about its vertical axis, continuously drawing a solid tube-like structure downward from the plastic oxide mass surrounding the lower end of the mandrel, and cooling the drawn structure to a temperature below which it becomes rigid. The lower portion of the mandrel is so shaped as to prevent the plastic glass melt from sliding off the deposition zone, rather the tube is drawn from an accumulated boule or mass in a manner well known in the art of glass drawing.

As used herein, vapor phase oxidation includes "chemical vapor deposition" and other vapor phase oxidation methods. The phrase "chemical vapor deposition" means the formation of deposits by chemical reactions which take place on, at, or near the deposition surface, a definition set forth on page 3 of the text "Vapor Deposition" edited by C. F. Powell et al., New York, John Wiley & Sons, Inc., 1966, which text is hereby wholly expressly incorporated by reference. Any of the procedural variations well known in the art may be employed to affect the deposition of a suitable coating of glass by the chemical vapor deposition process.

Effective means of applying coatings by vapor phase oxidation is to sinter a soot layer of the desired material applied by "flame hydrolysis" process, as hereinafter defined, similarly to that described in U.S. Pat. No. 2,272,342 issued to J. F. Hyde or U.S. Pat. No. 2,326,059 issued to M. E. Nordberg, both of which patents are expressly incorporated herein by reference.

As will be understood, glass for optical waveguides is commonly formed by entraining a vapor in a carrier gas which is supplied to a deposition burner. The gas is reacted to deposit a soot of finely divided material.

Early literature refers to the chemical process such as that of the Nordberg and Hyde patents, as flame hydrolysis. Recently, however, workers in the field have come to recognize that the chemical process is not hydrolysis but rather is oxidation. The "Handbook of Chemistry and Physics" describes oxidation as a process which increases the proportion of oxygen or acid forming elements in a compound. On the other hand, hydrolysis is defined as a reaction involving the splitting of water into its ions in the formation of a weak acid or base, or both. The definition of oxidation better describes the process which occurs in vapor deposition processes of this type. In any event, the burner is used in the prior art in the same way. The term "oxidizing" is used herein in the alternative for hydrolyzing because it more precisely describes the chemical process involved. The resultant product is the same regardless of the term used to describe the process.

"Soot" member, article, structure or preform as used herein is defined as a member, article, structure or preform formed of soot particles adhered to adjacent particles but not sintered or consolidated, namely a porous unconsolidated structure.

SUMMARY OF THE INVENTION

It is an object of this invention to provide a method of forming a substantially continuous preform for an optical filament, the preform itself, and the resulting optical filament.

Another object of this invention is to provide a substantially continuous method of forming an optical waveguide preform while continuously removing the starting member or bait from the preform body, and one which overcomes the disadvantages heretofore noted.

Briefly, according to this invention, a substantially continuous method of and apparatus for forming a preform for an optical filament, the preform itself, and the resulting optical fiber is disclosed. A starting member, mandrel or bait is provided and particulate material is applied to the exterior surface thereof to form a coating thereon. The coating is longitudinally translated while additional particulate material is simultaneously applied to the coating whereby the preform body is started; the preform body being thereafter longitudinally translated away from the starting member. By such longitudinal translation of the preform body, the starting member is continuously removed from the preform body as additional particulate material is applied whereby a longitudinal aperture remains in the preform body as it is being formed. The article so formed may thereafter be heated, consolidated, and drawn into an optical filament, the interior portion of which comprises the core while the outer portion comprises the cladding of the optical filament. The composition of the particulate material applied by burners or other suitable means may be controlled in accordance with the predetermined desired cross-sectional composition variation of the preform body.

These and other objects, features and advantages of the present invention will become apparent to those skilled in the art from the following detailed description and the attached drawings, on which, by way of example, only the preferred embodiments of this invention are illustrated.

DETAILED DESCRIPTION OF THE INVENTION

It is to be noted that the drawings are illustrative and symbolic of the present invention and there is no intention to indicate scale or relative proportions of the elements shown therein. For purposes of simplicity, the present invention will be described in connection with the substantially continuous formation of an optical waveguide preform and the waveguides themselves although this invention is not intended to be limited thereto.

Figure 1:
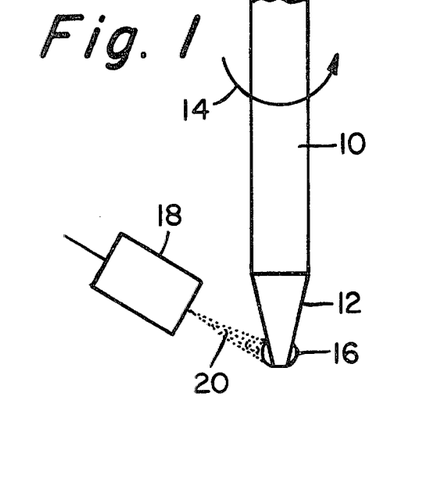
FIG. 1 is a fragmentary elevational view illustrating the commencement of the application of particulate material to the continuously removable starting member.

Referring to FIG. 1, there is shown a starting member or bait 10. As will be hereinafter more fully described, end 12 of starting member 10 is preferably tapered. Starting member 10 may also be connected to any means known in the art, not shown, for rotation about its longitudinal axis as indicated by arrow 14 if desired, and as hereinafter more fully described. Starting member 10 may be formed of any suitable material such as glass, Pt, Ta, C, refractory material such as for example $Al_2O_3$, mullite, $Si_3N_4$, or the like, and must be suitable for utilization through the hereinafter described subsequent steps without degrading. Ordinarily, starting member 10 would be cylindrical, however, the geometric shape is not critical. Starting member 10 may be hollow or have internal channels such that gas can be passed through it. Starting member 10 may have an annular opening or an annular ring of holes or orifices for the purpose of exhausting a gas during the process of applying or depositing a coating 16, as hereinafter described, to prevent deposition of particles on starting member 10 at a location beyond that where the article or ultimate article of the present invention is being deposited or formed.

A coating 16 of particulate material which will ultimately form the article of the present invention, such as for example, an optical waveguide preform, is then deposited by means of one or more burners 18 on the surface of end 12 of starting member 10. Any burners which provide a stream of particulate material that can be directed to the starting member are suitable for the present purposes. For an illustration of the suitable burner, reference is made to U.S. Pat. No. 3,565,345. It will also be understood that the terms "burner" or "burners" as used herein shall not be limited to burners as described above, rather shall include all other means suitable for generating and depositing particulate or soot material including means for none-fuel fired heating of particulates using electrical resistance heating, plasma heating, induction heating and the like.

The particulate material 20 which forms coating 16 may by any suitable material, as for example, in the formation of an optical waveguide preform, material suitable for the core and cladding of an optical waveguide. Suitable means for delivering constituents to burner 18 may be any means known in the art, for an illustration of which reference is made to U.S. application Ser. No. 872,619 filed Jan. 26, 1978 by M. A. Aslami, now U.S. Pat. No. 4,212,663, and U.S. Pat. No. 4,173,305 to M. G. Blankenship, which application and patent are hereby expressly incorporated by reference.

It will be understood that the fabrication process illustrated in the figures and described herein contemplates that the article being formed is disposed vertically with particle deposition occurring at its upper end and translation being in a vertical downward direction, however, the present invention also contemplates and includes the reverse or inverted process where deposition takes place at the bottom of the article being formed and translation thereof is in the vertical upward direction. In the latter situation and the starting member or bait would, of course, be inverted with end surface 12 thereof being disposed in a generally upward direction.

Figure 2:
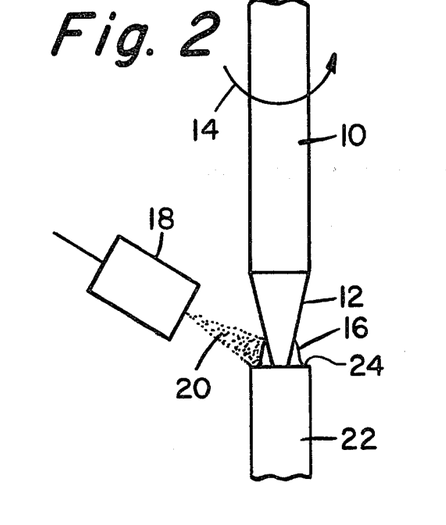
FIG. 2 is a fragmentary elevational view illustrating another method of starting of the application of particulate material to the continuously removable core member.

Referring additionally to FIG. 2, it is seen that the deposition of coating 16 on the surface of end 12 of starting member 10 may be facilitated at the outset by a second member 22 which provides a relatively broad deposition surface 24. Second member 22 may be a refractory material tube or rod. In this manner, the deposition efficiency of applying coating 16 to starting member 10 is increased by providing a broader target as the process is commenced. After the deposition of coating 16 has progressed sufficiently, the second member 22 may be removed and the deposition continued as hereinafter more fully described.

Figure 3:
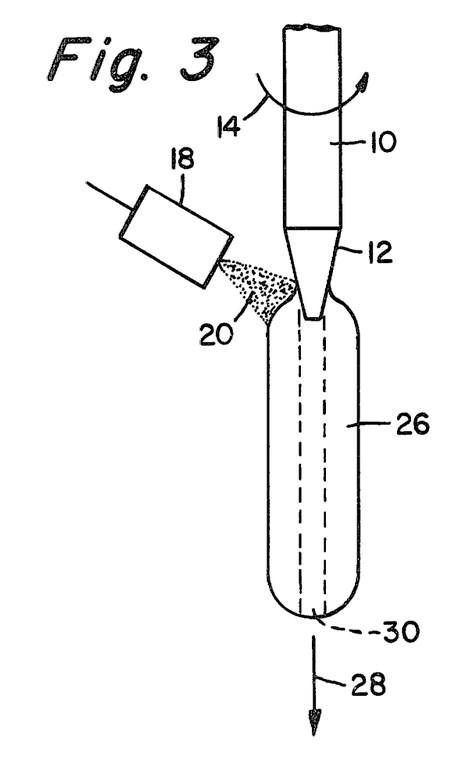
FIG. 3 is a fragmentary elevational view illustrating the substantially continuous formation of an article wherein the starting member is continuously removed.

Referring additionally to FIG. 3, it is seen that as particulate material 20 is continually applied a preform body 26 is formed. Starting member 10 is continuously removed from preform body 26 by longitudinally translating preform body 26 while additional particulate material is applied to the end of said body surrounding end 12 of starting member 10. It is, therefore, seen that as preform body 26 is longitudinally translated in the direction of arrow 28, it is continuously removed from end 12 of starting member 10 resulting in a substantially continuous process of forming a preform body having a longitudinal aperture 30 remaining as a result of being removed from starting member 10.

Figure 4:
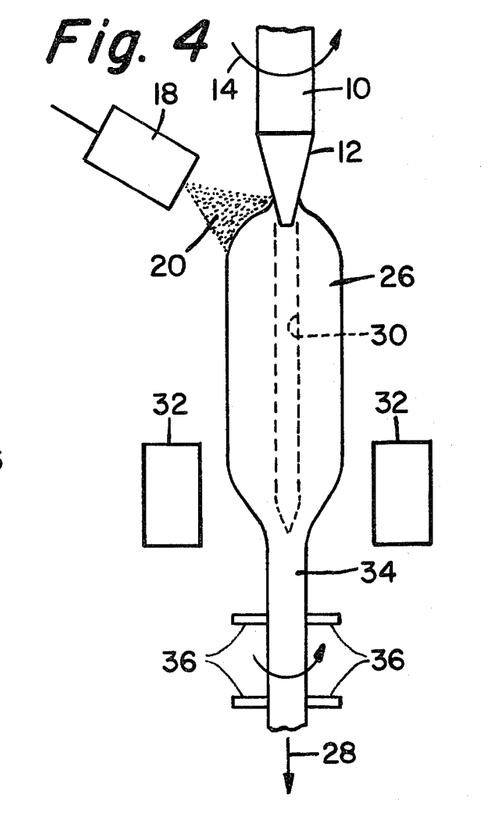
FIG. 4 is a fragmentary elevational view illustrating the further step of consolidating the article of FIG. 3 into a solid preform.
Figure 5:
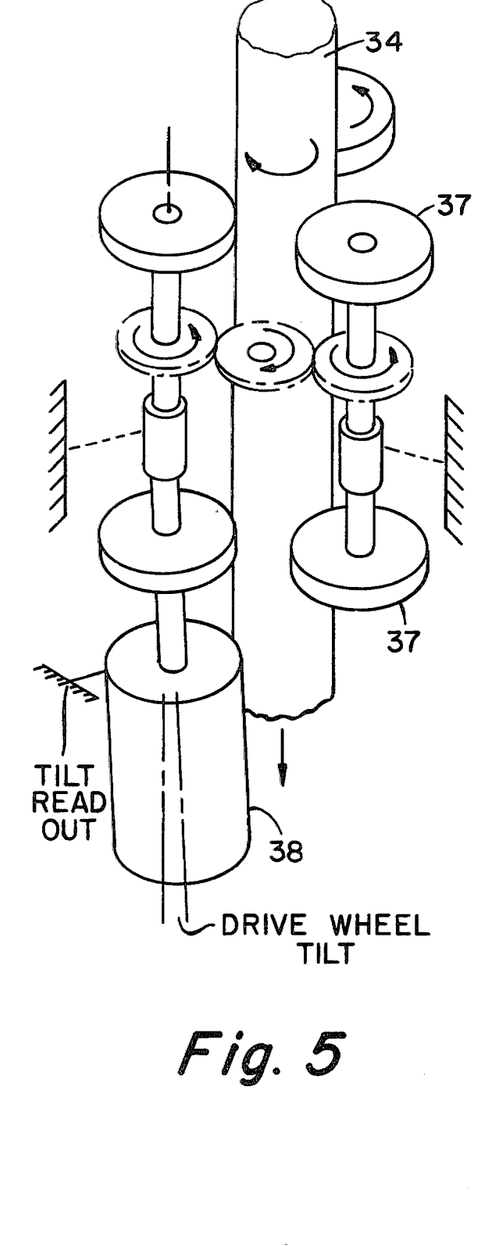
FIG. 5 is a schematic illustration of a means for supporting, rotating and translating the article being formed.

Referring to FIG. 4, there is seen that as preform body 26 is continuously formed by the continuous application of particulate material 20 and translated as indicated by arrow 28, the preform may enter a heating zone illustrated by heaters 32 where the particulate material is consolidated into a solid preform 34 and the longitudinal aperture 30 is closed or collapsed. Also illustrated is a means 36 for supporting, rotating, and translating the preform as it is being formed. It will be understood that rotation of the preform may be in the same direction as the rotation of starting member 10 or may be in the opposite direction. An illustration of means 36 may be more fully described with reference to FIG. 5 where means 36 comprise one or more sets of three or more planetary drive wheels 37 designed and disposed to exert a force toward the longitudinal axis of consolidated preform 34 to effect both support and rotation of the entire preform or article. The planetary drive wheels are driven by motor 38 and associated gearing. By tilting the axis of one or more of the planetary drive wheels, whereby the axis thereof is not parallel to the longitudinal axis of preform 34, the wheel or wheels will also exert a longitudinal force on the preform thus providing translation motion as well as rotation. It will be understood that the means of FIG. 5 is simply an illustration of one means of providing translation and rotation of the article being formed and is not critical to the present invention since any other suitable means for support, translation and rotation, known in the art, may also be used.

Figure 6:
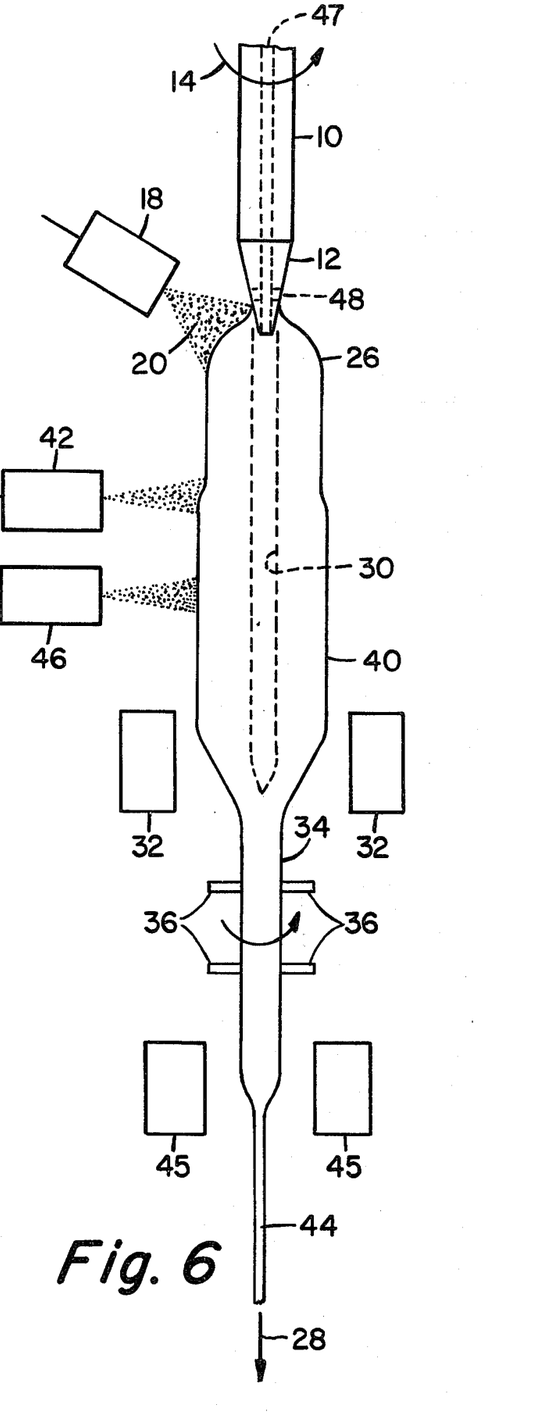
FIG. 6 is a fragmentary elevational view illustrating the application of particulate material to the preform of the present invention from a plurality of burners, and thereafter consolidating and drawing the preform into an optical fiber.

Referring additionally to FIG. 6, where preform 26 is to be a preform for an optical waveguide, it may be desirable to apply a second particulate coating 40 to form the cladding of the ultimate waveguide. It will be understood that, by appropriate application of particulate material, the desired cross-sectional composition variation may be achieved at the outset by burner or burners 18, however, where desired an additional particulate coating 40 may be applied by one or more secondary burners 42. In connection with burners 18 and 42, it will be understood that such burners may be rotated if desired, or a ribbon burner may be used as is well known in the art.

There is additionally shown in FIG. 6 a further step of the substantially continuous method of forming an optical waveguide 44 whereby solid preform 34 may be sequentially heated along its longitudinal path by heaters or furnace 45 by which means the temperature of a desired portion of the composite theretofore formed is raised to the drawing temperature of the materials thereof and drawn into an optical waveguide or filament 44 in a manner well known in the art. As will be understood, in such a continuous method, the translational velocity of preform body 26, solid preform 34, and optical waveguide or filament 44 will each be of a magnitude sufficient to permit uniform deposition of particulate material to end 12 of starting member 10. The translational velocity up to the point of drawing the solid preform into an optical waveguide or filament will generally be quite uniform but, thereafter, substantially increased to a velocity sufficient to permit the drawing of waveguide or filament 44. As will be understood, when a solid preform 34 is drawn into a filament 44, the length thereof is substantially increased, wherefore, the longitudinal velocity must be increased to facilitate the substantially increased length of filament 44 over the length of preforms 26 and 34. For a teaching of application of particulate material, consolidation, and drawing reference is hereby made to U.S. Pat. No. 3,659,915 to R. D. Maurer and P. C. Schultz, U.S. Pat. No. 3,711,262 to D. B. Keck and P. C. Schultz, U.S. Pat. No. 3,737,292 to D. B. Keck, P. C. Schultz and F. Zimar, U.S. Pat. No. 3,737,293 to R. D. Maurer, U.S. Pat. No. 3,775,075 to D. B. Keck and R. D. Maurer, U.S. Pat. No. 3,806,570 to J. S. Flamenbaum, P. C. Schultz, and F. W. Voorhees, U.S. Pat. No. 3,859,073 to P. C. Schultz, and U.S. Pat. No. 3,884,550 to R. D. Maurer and P. C. Schultz, all of which patents are hereby expressly incorporated by reference.

There is also illustrated in FIG. 6 an auxiliary burner 46 disposed downstream of secondary burner 42 and fed with natural gas and air to form a relatively turbulent heated zone which prevents the deposition of low adherence soot particles from the fringes of the secondary burner and to prevent thermal shock of preform 26 upon its entry into consolidation furnace or heating zone formed by heaters 32. Also illustrated in FIG. 6 is an aperture 47 within starting member 10 and a ring of radially disposed orifices 48. Drying gas, such as chlorine or the like, may be flowed through aperture 47 into porous preform 26 and through the pores of preform 26 to ambient. Gas flow through orifices 48, which may be connected through channels, not shown, in starting member 10 to a suitable source of gas, provides a gaseous shield preventing soot from being deposited above the orifices on the starting member. It is understood that the above described features permit a higher optical quality preform to be formed, facilitate better fabricating procedures, and are therefore preferred, however, are not indispensible to the present invention.

Figure 7:
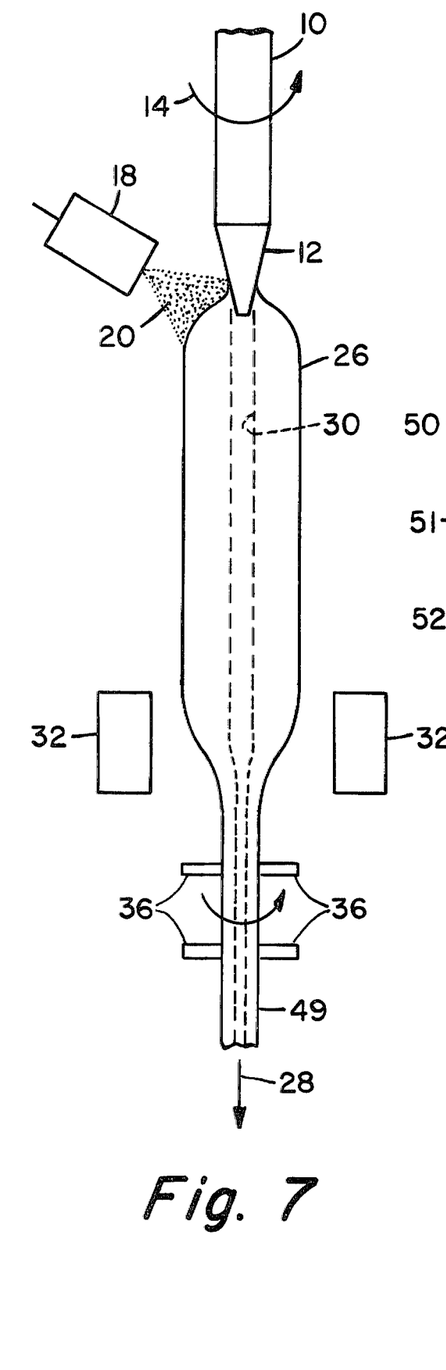
FIG. 7 is a fragmentary elevational view of another embodiment of the present invention.

Another embodiment of the present invention is illustrated in FIG. 7 wherein preform body 26 is consolidated by means of heaters 32 into a solid preform 49 which maintains longitudinal aperture 30 after consolidation. In such an embodiment, solid preform 49 may be used with an aperture if such application is desired or may, thereafter, have the aperture collapsed to form a solid preform.

Figure 8:
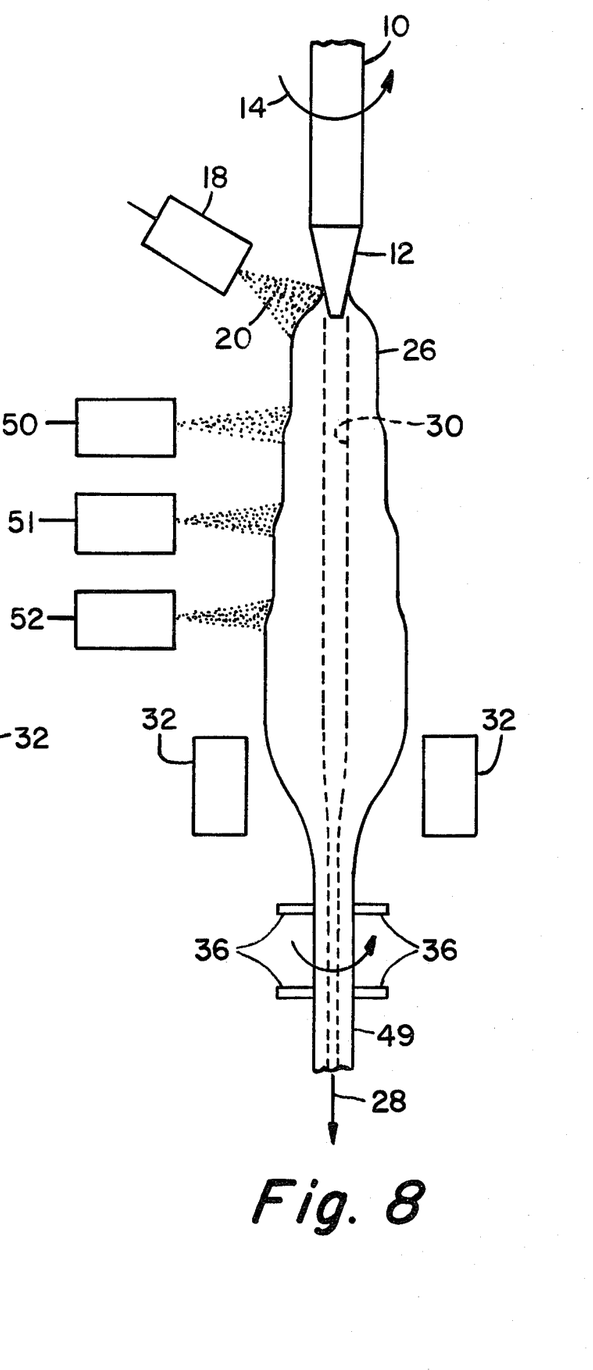
FIG. 8 is a fragmentary elevational view illustrating still a further embodiment of the present invention.

Still another embodiment of the present invention is illustrated in FIG. 8 wherein a plurality of burners 50, 51, and 52 are employed to apply additional coatings of particulate material to the outside surface of preform 26 formed initially by burner 18. Such additional application of particulate material may be desirable to obtain a predetermined desired cross-sectional compositional variation. Burners 50, 51 and 52 may be used to apply the same composition or different composition of particulate material or variations of particulate material compositions. Although the illustration in FIG. 8 shows the preform body to be consolidated by heaters 32 into a solid preform 49 having a longitudinal aperture therein, it will be understood that the internal aperture may be closed as illustrated in FIGS. 4 and 6 and subsequently drawn as illustrated in FIG. 6 as part of the same operation. It will also be understood that solid preforms 34 and 49, as illustrated in FIGS. 4 and 8 respectively, may be severed at desired lengths and, if desired, subsequently have longitudinal aperture collapsed when it exists and drawn into an optical waveguide or filament.

The heaters described herein may be any known heat source such as a furnace, flame, laser, resistance heater, induction heater, or the like; the particular heater means is not critical to the present invention.

EXAMPLE I

A specific example of the substantially continuous method of forming an article or optical waveguide blank is as follows. A starting member formed of $Al_2O_3$ having a diameter of approximately 6 mm. and a tapered end portion is introduced into a controlled environment enclosure. A flat face burner similar to the type described in U.S. Pat. No. 3,698,936 to H. J. Moltzon is disposed at a distance of about 13 centimeters from the exterior surface of the tapered end of the starting member at an angle of approximately 90° from the longitudinal axis. The starting member is attached to a rotation apparatus known as a head stock chuck which can vary in rotational speed from about 10 RPM to 1000 RPM, with a typical use speed of about 60 RPM.

Reactants are flowed to the burner from a delivery system such as described in the heretofore noted Aslami application. The parameters of the reactant flow of this example are 1.6 SLPM (standard liters per minute) oxygen, 8 grams per minute $SiCl_4$, 1 gram per minute $POCl_3$, 2 grams per minute $GeCl_4$. The total burner flow is 3.5 liters per minute of oxygen and 4.0 liters per minute of natural gas. The burner has an inner and outer shield of oxygen with 2.0 liters per minute oxygen flow as the inner shield and 6.0 liters per minute oxygen flow as an outer shield.

After the deposition of the fine soot particles on the tapered end of the starting member has begun, the deposition rate of the fine soot particles is about 0.6 grams per minute. After a sufficient quantity of soot particles have been deposited on the tapered end of the starting member and on the end of a second member refractory starting tube as illustrated in FIG. 2, the coating of soot particles is translated longitudinally along the longitudinal axis thereof in a direction away from the starting member by an apparatus known as a translator and generally described in connection with FIG. 5. A translator is a mechanism designed to rotate the deposited article or member at the same rate as the head stock chuck and starting member, and at the same time slowly translate the deposited member or article away from the head stock along its longitudinal axis at a controlled rate. The translation rate can be varied from about 0.2 mm per minute to about 50 mm per minute. The faster the translation the smaller the cross sectional area of glass that is deposited. For this example, a translation rate of about 2.4 mm per minute is used and the outer diameter of the soot member is deposited to a maximum of about 50 mm. This apparatus also rotates the coating of soot particles about the longitudinal axis at a rate of about 60 RPM.

As the coating of soot particles is built up and caused to translate along the longitudinal axis thereof, the starting member is continuously removed from the preform body being formed leaving a longitudinal aperture remaining therein. The porous preform so formed is then passed through a heating zone wherein the particles are consolidated to form a solid preform. The heating apparatus or consolidation furnace comprises a resistance heated unit with high temperature elements such as Super Kanthal, and a muffle to partially enclose and contain the consolidation atmosphere which is 40 SLPM helium with 4 SLPM oxygen for this example. The consolidation temperature is about 1550° C.

The resultant cross-sectional composition of the preform formed in accordance with this example is approximately 7 weight percent $P_2O_5$ at the centerline of the preform substantially linearly decreasing to about 4 weight at the outside diameter; 22 weight percent $GeO_2$ at the centerline substantially uniformly decreasing to about 13 weight percent at the outside diameter; the balance of the composition comprising $SiO_2$ across the diameter of the preform.

The solid preform is thereafter subjected to a further heating step wherein the temperature of the preform is raised to the drawing temperature of the materials thereof, approximately 1900° C., and the preform is drawn into a filament or strand. The filament is coated with a relatively low index of refraction polymer such as a silicone, room temperature vulcanizable rubber, which when heat cured both protects the glass filament from abrasions, thus preserving strength, and acts as a fiber optical cladding.

The optical characteristics of the resulting filament or strand are as follows. Attenuation at 820 nm of 8 dB/km, attenuation at 1060 nm of 6 dB/km, −3 dB optical bandwidth of about 20 MHz km, and a numerical aperture of about 0.3.

EXAMPLE II

Another example of the substantially continuous method of forming an optical waveguide in accordance with the present invention is as follows. A first flat faced deposition burner as described in the proceeding example is employed to deposit a $GeO_2.P_2O_5.SiO_2$ core soot member. A second flat faced burner is placed about 5 cm downstream from the first burner such that its flame and soot stream will deposit a second coating of soot particles on the already deposited soot member. The operating conditions for this second burner are identical to the first burner with the exception that no $GeCl_4$ and no $POCl_3$ are used.

This second burner deposits predominantly $SiO_2$, a lower index of refraction glass than that from the first burner, and the second glass will form the cladding of the resultant fiber. Deposition continues until the outer diameter of the soot member reaches about 70 mm. The deposition rate is about 0.7 grams per minute.

A third burner, called an auxiliary burner, is typically placed about 5 cm downstream from the second burner and fed with natural gas and air to form a relatively turbulent heated zone which prevents the deposition of low adherence soot particles from the fringes of the second burner and to prevent thermal shock of the soot member upon its entry into the consolidation zone.

The consolidation of the soot member is performed in a furnace at a temperature of about 1600° C. A controlled axial gas is flowed through a longitudinal aperture in the starting member to remove hydroxyl ions from the soot member as it is heated within the consolidation furnace. Such drying gas may be a mixture of 40 standard cubic centimeters per minute of chlorine and 0.75 SLPM of helium. In addition, a second gas flow such as nitrogen at about 1 SLPM is passed through channels within the starting member exiting radially in a ring pattern of orifices at the upper edge of the deposited soot from the first burner. This gas flow insures that soot is not deposited above the ring of orifices on the starting member. The soot member is thus consolidated.

The consolidated member or preform passes into a second heating zone which may be a high temperature resistance heated graphite furnace, induction heated zirconia furnace, $H_2/O_2$ heated flame or a $CO_2$ laser heated zone operated at sufficient power levels to raise the consolidated preform glass to a temperature of 1700° to 2100° C. For this example, the typical furnace temperature is at about 1850° C. Through the use of a starting silica rod and fiber pulling techniques known in the art, a continuous filament of glass clad waveguide is then drawn. Again, plastic coatings are typically applied to protect the glass filament during handling, but the optical properties of the plastic coating are not essential in the operation of this filament as an optical fiber or waveguide since the second burner deposited lower index of refraction glass that acts as the optical waveguide cladding.

Typical optical performance properties of optical waveguides fabricated in this manner are as follows: Attenuation at 820 nm is 5 dB/km, attenuation at 1060 nm is 3 dB/km, bandwidth is 25 MHZ.km, numerical aperture is about 0.25 and the core to outside diameter ratio is about 0.7 or a 100 μm diameter core when the fiber outer diameter is drawn to about 150 μm diameter.

EXAMPLE III

Still another example of the substantially continuous method of forming an article in accordance with the present invention is as follows. With reference to FIG. 8, burners 18, 50, 51 and 52 are operated under the same conditions described for the second burner in Example II. The reactant is $SiCl_4$ and resulting glass is $SiO_2$. The preform center hole 30 is not closed during consolidation and the resultant article is a continuously produced tube.

It is to be understood that the above described examples have not been fully reduced to practice, however, substantial and sufficient experimentation, and practice of the invention has taken place to reasonably ascertain the various parameters and steps set forth.

Optical waveguides produced in accordance with the present invention, by the substantially continuous method of forming an optical waveguide preform and a resulting optical waveguide, are suitable and adapted to the propagation of energy of one or many modes. Other very significant and very important advantages of the substantially continuous method for forming articles or optical waveguide blanks and the subsequent optical waveguides of the present invention are as follows. Through the addition of more soot depositing burners it is possible to both significantly increase the deposition or glass formation rate, and to provide improved tailoring of radial glass properties such as making a near-parabolic radial index of refraction profile for the optical waveguide core which provides high bandwidth or information carrying capacity optical waveguides. In addition, this continuous method may be used to fabricate high quality optical glass tubing of silica or various doped silica compositions through the use of appropriate halide or other relatively high vapor pressure metallic component dopants in the fume delivery step.

Although the present invention has been described with respect to specific details of certain embodiments thereof it is not intended that such details be limitations upon the scope of the invention except insofar as set forth in the following claims.

I claim:

1. A substantially continuous method of forming an article comprising the steps of
   providing a starting member or bait,
   applying particulate material to the exterior surface of said starting member to form a coating thereon,
   longitudinally translating said coating while simultaneously applying additional quantities of said particulate material to said coating whereby a body is formed, said body being thereafter longitudinally translated, and
   continuously removing said starting member from said body by said longitudinal translation of said body as said additional quantities of said particulate material is applied, a longitudinal aperture remaining in said body following said removal of said starting member.

2. The method of claim 1 wherein said particulate material is applied by at least one burner.

3. The method of claim 2 further comprising the step of applying a second coating of particulate material to the outside surface of the body so formed to form a cladding therefor, said body comprising the core, said second coating having an index of refraction lower than that of said core.

4. The method of claim 1 wherein said particulate material is applied by a plurality of burners.

5. The method of claim 4 wherein the composition of said particulate material from said burners is controlled to provide a predetermined desired cross-sectional composition variation of said body.

6. The method of claim 5 wherein said preform comprises a core and cladding, the index of refraction of said cladding being less than that of said core.

7. The method of claim 6 further comprising the step of heating the body so formed to consolidate said particulate material.

8. The method of claim 7 further comprising the step of collapsing said longitudinal aperture simultaneously with the step of consolidating said particulate material.

9. The method of claim 7 further comprising the step of collapsing the longitudinal aperture following the step of consolidating said particulate material.

10. The method of claim 7 further comprising the steps of
heating said body to the drawing temperature of the material thereof, and
drawing said body into an optical filament.

11. The method of claim 10 further comprising the step of collapsing the longitudinal aperture while drawing said optical filament.

12. The method of claim 1 further comprising the step of heating the body so formed to consolidate said particulate material.

13. The method of claim 1 further comprising the step of rotating said starting member while said particulate material is being applied.

14. The method of claim 13 further comprising the step of rotating said body in the same direction as the rotation of the starting member while simultaneously longitudinally translating said body.

15. The method of claim 13 further comprising the step of rotating said body in a direction opposite to the rotation of said starting member while simultaneously longitudinally translating said body.

16. The method of claim 13 further comprising the steps of
rotating said body while simultaneously longitudinally translating it,
heating the body so formed to consolidate said particulate material,
heating the body to the drawing temperature of the materials thereof, and
drawing said body into an optical filament.

17. The method of claim 16 further comprising the step of collapsing said longitudinal aperture simultaneously with the step of consolidating said particulate material.

18. The method of claim 16 further comprising the step of collapsing said longitudinal aperture following the step of consolidating said particulate material.

19. The method of claim 16 further comprising the step of collapsing said longitudinal aperture while drawing said optical filament.

20. The method of claim 1 further comprising the step of simultaneously rotating said body while it is longitudinally translated.

21. An apparatus for forming a substantially continuous article comprising
a starting member or bait,
means for applying particulate material to the exterior surface of at least a portion of said starting member to form a hollow porous article, and
means for longitudinally translating said hollow porous article while said particulate material is being applied, said starting member being continuously removed from said article by said longitudinal translation thereof as said particulate material is being applied.

22. The apparatus of claim 21 wherein said means for applying particulate material is at least one burner.

23. The apparatus of claim 21 wherein said means for applying particulate material is a plurality of burners.

24. The apparatus of claim 23 further comprising an auxiliary heater disposed downstream from said plurality of burners.

25. The apparatus of claim 21 further comprising means for heating the porous article to a temperature sufficient to consolidate said particulate material.

26. The apparatus of claim 25 further comprising means for controlling the application of particulate material so as to provide a predetermined desired cross-sectional composition of said porous article.

27. The apparatus of claim 26 further comprising
means for heating the porous article to the drawing temperature of the material thereof, and
means for drawing said porous article into an optical filament.

28. The apparatus of claim 21 further comprising means for rotating said starting member while said particulate material is being applied.

29. The apparatus of claim 28 further comprising means for rotating said porous article in the same direction as the rotation of said starting member.

30. The apparatus of claim 28 further comprising means for rotating said porous article in a direction opposite to the rotation of said starting member.

31. The apparatus of claim 21 further comprising
means for rotating said porous article while it is simultaneously longitudinally translated,
means for heating said porous article to consolidate said particulate material,
means for heating the consolidated article to the drawing temperature of the materials thereof, and
means for drawing said consolidated article into an optical filament.

32. The apparatus of claim 21 wherein said starting member defines a central longitudinal aperture within said starting member.

33. The apparatus of claim 32 wherein said starting member further comprises a tapered end portion.

34. The apparatus of claim 33 wherein said starting member further defines a plurality of radial orifices disposed within said tapered end portion thereof intermediate the ends thereof.

35. The apparatus of claim 34 further comprising means for rotating said starting member while said particulate material is being applied.

36. The apparatus of claim 35 further comprising means for rotating said porous article.

37. The apparatus of claim 36 further comprising means for rotating said porous article in the same direction as said starting member.

38. The apparatus of claim 36 further comprising means for rotating said porous article in the direction opposite to the rotation of said starting member.

39. The apparatus of claim 36 wherein said means for applying particulate material is a plurality of burners.

40. The apparatus of claim 39 further comprising an auxiliary heater disposed downstream from said plurality of burners.

41. The apparatus of claim 40 further comprising means for heating said porous article to consolidate said particulate material.

42. The apparatus of claim 41 further comprising means for heating the consolidated article to the drawing temperature of the materials thereof, and means for drawing said consolidated article into an optical filament.

43. The apparatus of claim 42 further comprising means for controlling the application of particulate material so as to provide a predetermined desired cross-sectional composition of said porous article.

* * * * *

UNITED STATES PATENT AND TRADEMARK OFFICE
CERTIFICATE OF CORRECTION

PATENT NO. : 4,310,339

DATED : January 12, 1982

INVENTOR(S) : Michael G. Blankenship

It is certified that error appears in the above-identified patent and that said Letters Patent is hereby corrected as shown below:

Column 1, line 34, "1967" should read -- 1976 --.

Column 6, line 46, "$A2_2O_3$" should read -- $Al_2O_3$ --.

Column 7, line 9, "by" should read -- be --.

Column 7, line 28, delete "and" after "situation".

Column 9, line 48, after "have" insert -- the --.

Column 10, line 29, after "stock" insert -- chuck --.

Column 3, line 3, "purities" should read -- impurities --.

Signed and Sealed this

Third Day of August 1982

[SEAL]

Attest:

GERALD J. MOSSINGHOFF

*Attesting Officer*     *Commissioner of Patents and Trademarks*